Patented Oct. 5, 1954

2,691,049

UNITED STATES PATENT OFFICE 2,691,049

PROCESS FOR THE PRODUCTION OF ACROLEIN ACETALS

Donald G. Thomas, Kalamazoo, Mich., assignor to The Upjohn Company, Kalamazoo, Mich., a corporation of Michigan No Drawing. Application August 14, 1950, Serial No. 179,378

7 Claims. (Cl. 260—615)

This invention relates to the production of acetals of $\alpha,\beta$-unsaturated aldehydes, and in particular to a method for the production of acetals of acrolein and aliphatic alcohols. It relates particularly to the use of trichloroacetic acid as a catalyst for such condensation reactions.

The olefinic double bond of acrolein,

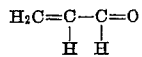

is much more reactive, due to its conjugation with the carbonyl of the aldehyde group, than an ordinary isolated double bond. The double bond in acrolein is as reactive toward most carbonyl reagents as the carbonyl group itself. Thus, with but few exceptions, e. g., Grignard reagents, those reagents which react with the aldehyde group of acrolein also react with the carbon-carbon double bond to form a propionaldehyde derivative instead of the desired acrolein derivative. Whether the saturation of the carbon-carbon double bond results from a direct addition to the double bond or from an initial reaction with the aldehyde group followed by a rearrangement is of little significance, since the catalysts which promote reactions with the aldehyde function of acrolein are the same catalysts which promote addition reactions of the double bond and rearrangement of aldehyde addition products.

The difficulty of direct preparation from acrolein of acrolein derivatives in which the carbon-carbon double bond function remains intact during the reaction, is manifest by the fact that, although acrolein has been known for over one hundred years, and methods for the direct preparation of acetals have been investigated during the past fifty years, the best yields reported for the direct reaction of acrolein and an aliphatic alcohol to produce an acetal of acrolein are not higher than about thirty percent of the theoretical. F. P. Pingert, Organic Syntheses, vol. 25, page 1, New York, John Wiley and Sons, 1945, reports a yield of from 24 to 30 percent of acrolein acetal and 21 to 26 percent of $\beta$-ethoxy-propionaldehyde acetal by reaction of acrolein and ethanol in the presence of hydrochloric acid.

The difficulty of the direct preparation of acrolein acetals is so well recognized in the art, that attempts have been made to do indirectly what was difficult to do directly. Procedures have been proposed whereby the carbon-carbon double bond is protected during the acetal formation by the use of reagents which produce a saturated or propionic aldehyde. After the acetal is formed by known procedures for saturated aldehydes, the carbon-carbon double bond is regenerated by removal of the protective group. However, wide experience with such procedures has shown that they offer no advantages over direct methods for making acetals of acrolein as the yields are likewise low and the products of poor quality.

Acrolein and acrolein diacetate are readily available, but at the present time no acetal of acrolein is commercially available, which indicates that the available methods for the production of acrolein acetals are unsuitable for commercial production.

It has been found that acetals of acrolein can be prepared in good yields from acrolein and lower aliphatic monohydric alcohols by heating a mixture of acrolein, a lower monohydric aliphatic alcohol, and an inert, water-immiscible organic solvent at temperatures between about 25 and 50 degrees centigrade in the presence of about 0.1 to 1.0 mole percent (based on the acrolein) of a strong carboxylic acid, such as trichloroacetic acid, while continuously removing the water from the reaction zone as it is formed during the course of the reaction. This corresponds to an amount of approximately 0.1635 to 1.635 grams of trichloroacetic acid per mole of acrolein. When less than 0.1 mole percent is used, the reaction is so slow that much of the acrolein polymerizes, thus making it unavailable, while if more than 1.0 mole percent is used, a competing reaction sets in to form appreciable quantities of an acetal of a beta alkoxy-propionaldehyde.

Below 25 degrees centigrade the reaction rate is so slow that the process is uneconomical, while above 50 degrees centigrade, undesirable amounts of acetals of a beta alkoxy-propionaldehyde are formed, thus decreasing the amount of acrolein acetal which can be obtained. A preferred temperature range is between about 25 degrees centigrade and about 35 degrees centigrade, as it is in this range that optimum yields of acetal are obtained with a minimum of propionaldehyde derivatives.

The water formed during the course of the reaction is conveniently removed as it is formed by distillation as an azeotropic mixture with a water-immiscible, inert organic liquid. As some alcohol and acrolein co-distill with the water and reaction solvent, a preferred procedure is to separate the organic phase and return it to the reaction zone. Since a slight amount of alcohol and acrolein are dissolved in the water which is separated from the organic phase, a preferred form of the invention comprises continuing the reaction until somewhat more than the theoretical volume of aqueous phase has been collected, a volume of about 130 percent of the calculated stoichiometrical amount being preferred. Suitable apparatus for the continuous separation of water and return of the organic phase to the reaction mixture is the phase separator illustrated in Harold J. Lucas and David Pressman, "Principles and Practice of Organic Chemistry," John Wiley and Sons, New York, 1949, page 249, and the automatic separator (with drying chamber to free the organic solvent of dissolved water by contact with silica gel or other solid dehydrating agents) illustrated in "Organic Syntheses," Collective Volume I, second ed., edited by A. H. Blatt, John Wiley and Sons, New York, 1941, page 261.

Among the water-immiscible, inert organic liquids which can be used are hydrocarbons and halogenated hydrocarbons such as benzene, toluene, xylenes, ethylene dichloride, methylene dichloride, carbon tetrachloride, pentanes, hexanes, and heptanes and the like. When the process is conducted under a reduced (subatmospheric) pressure, the inert, water-immiscible organic liquid need not boil below 50 degrees centigrade. However, for convenience and ability to operate at atmospheric pressures an organic liquid which boils below 50 degrees centigrade is preferred, such as Skellysolve F, a petroleum fraction containing a predominance of pentanes, boiling at 35 degrees centigrade and distilling between 35 and 60 degrees centigrade.

When carrying out the formation of acrolein acetals using trichloroacetic acid as a catalyst and a suitable solvent, the maximum yield obtainable in the minimum reaction time is obtained when two moles of alcohol, one mole of acrolein and 500 milliliters of solvent are used. The reaction time cannot be stated accurately, as it is greatly dependent upon the rate of reflux, the efficiency of the water-separating means, the reaction temperature, and the inert water-immiscible organic solvent used. It is best determined by observing the amount of aqueous phase which is collected by the water-separating means and stopping the reaction when the optimum amount has been collected; in general, the time required is approximately 100 hours for most alcohols, when the reaction is conducted in the preferred temperature range.

The acetal thus formed is conveniently isolated by removing the catalyst, preferably by neutralization with a mild base such as sodium bicarbonate or, more preferably, copper carbonate, and fractionally distilling the liquid to recover the inert solvent, alcohol and unreacted acrolein. The residue, which consists essentially of acrolein acetal, can be further purified if desired by fractional distillation at either atmospheric or a reduced pressure. As the unreacted components can be recovered and reused in subsequent reactions, the yield is very good.

Among the monohydric alcohols which can be used in the method of the present invention to prepare acetals of acrolein are methanol, ethanol, n-propanol, isopropanol, n-butanol, n-octanol, isobutanol, isopentanol, isooctanol, tertiary-butanol, and the like.

Certain of the acetals of acrolein which can be prepared by the method of this invention are new chemical compounds having valuable properties as solvents and as intermediates for the production of useful polymers and in chemical synthesis.

The following examples are given by way of illustration only and are not to be construed as limiting.

*Example 1.—Acrolein diethyl acetal,*
$H_2C=CH-CH(OC_2H_5)_2$

A mixture of 56 grams (approximately 1.0 mole) of acrolein, 92 grams (approximately 2.0 moles) of absolute ethanol and 0.5 gram (approximately 0.003 mole) of trichloroacetic acid was heated under reflux for 16 hours. One hundred and fifty milliliters of Skellysolve F was then added and the heating under reflux continued for 70.5 hours. An additional 0.5 gram of trichloroacetic acid was then added and the solution heated under reflux for an additional 24 hours. Upon neutralization with copper carbonate, filtration, and fractional distillation, there was thus obtained 41.6 grams (32 percent of theory) of acrolein diethyl acetal, which boiled at 118 to 119 degrees centigrade.

*Example 2.—Other acrolein acetals*

In a manner essentially as described in Example 1, the following acetals of acrolein were obtained in comparable yields:

A. Acrolein dimethyl acetal boiling at 87.5 to 88 degrees centigrade.

B. Acrolein diisopropyl acetal boiling at 68.5 to 69.5 degrees centigrade at 50 millimeters pressure.

C. Acrolein di-normal-propyl acetal boiling at 85 to 87 degrees centigrade at 46 millimeters pressure.

D. Acrolein di-normal-butyl acetal boiling at 109 to 120 degrees centigrade at a pressure of 39 millimeters.

E. Acrolein diisobutyl acetal boiling at 103 to 105 degrees centigrade at 61 millimeters pressure.

It is to be understood that this invention is not to be limited to the exact methods hereinbefore described, since obvious modifications will occur to a person skilled in the art in accordance with the principles disclosed herein.

I claim:

1. A process for the production of an acetal of acrolein wherein acrolein and a lower aliphatic alcohol are condensed which comprises heating together acrolein and the alcohol in the presence of approximately 0.1 to 1.0 mole of trichloroacetic acid per 100 moles of acrolein and an inert, water-immiscible organic liquid at a temperature between approximately 25 to approximately 50 degrees centigrade while continuously removing the water from the reaction zone in the form of an azeotropic mixture with the inert organic liquid as it is formed during the course of the reaction, and subsequently recovering the acrolein acetal.

2. A process as defined in claim 1 wherein the inert, water-immiscible organic liquid is a petroleum hydrocarbon fraction containing a predominance of pentanes.

3. A process for the preparation of acrolein diethyl acetal which comprises heating a mixture of acrolein, ethyl alcohol, an inert water-immiscible organic solvent and between approximately 0.1 and approximately 1.0 mole of trichloroacetic acid per 100 moles of acrolein at a temperature of approximately 35 degrees centigrade while continuously removing the water as it is formed during the course of the reaction, and subsequently recovering substantially pure acrolein diethyl acetal.

4. A process for the preparation of acrolein dipropyl acetal which comprises heating a mixture of acrolein, propyl alcohol, an inert water-immiscible organic solvent and between approximately 0.1 and approximately 1.0 mole of trichloroacetic acid per 100 moles of acrolein at a temperature of approximately 35 degrees centigrade while continuously removing the water as it is formed in the course of the reaction, and recovering substantially pure acrolein dipropyl acetal.

5. A process for the preparation of acrolein dibutyl acetal which comprises heating a mixture of acrolein, butyl alcohol, an inert water-immiscible organic solvent, and between approximately 0.1 and approximately 1.0 mole of trichloroacetic acid per 100 moles of acrolein at a temperature of approximately 35 degrees centigrade while continuously removing the water as it is formed during the course of the reaction, and recovering substantially pure acrolein dibutyl acetal.

6. A process for the preparation of acrolein dimethyl acetal comprising: heating a mixture of acrolein, methyl alcohol, an inert water-immiscible organic solvent and between approximately 0.1 and approximately 1.0 mole of trichloroacetic acid per 100 moles of acrolein at a temperature of approximately 35 degrees centigrade while continuously removing the water as it is formed during the course of the reaction, and recovering substantially pure acrolein dimethyl acetal.

7. A process for the production of an acetal of acrolein wherein acrolein and a lower aliphatic alcohol are condensed which comprises heating together acrolein and the alcohol in the presence of approximately 0.1 to 1.0 mole of trichloroacetic acid per 100 moles of acrolein at a temperature between approximately 25 to approximately fifty degrees centigrade while continuously removing the water as it is formed during the course of the reaction, and subsequently recovering the acrolein acetal.

References Cited in the file of this patent

UNITED STATES PATENTS

| Number | Name | Date |
|---|---|---|
| 1,850,836 | Guinot | Mar. 22, 1932 |
| 2,501,144 | Saunders | Mar. 21, 1950 |
| 2,535,458 | Robeson | Dec. 26, 1950 |

FOREIGN PATENTS

| Number | Country | Date |
|---|---|---|
| 553,177 | Germany | June 22, 1932 |

OTHER REFERENCES

Pingert: "Organic Synthesis," vol. 25 (1945), pages 1–4, John Wiley and Sons, New York.